A. E. DAUM.
DRAIN PLUG AND RELIEF VALVE.
APPLICATION FILED MAR. 19, 1915.
1,192,870.
Patented Aug. 1, 1916.
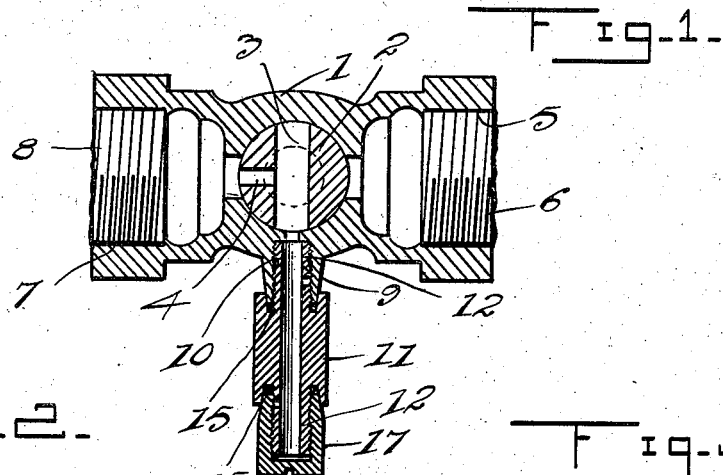
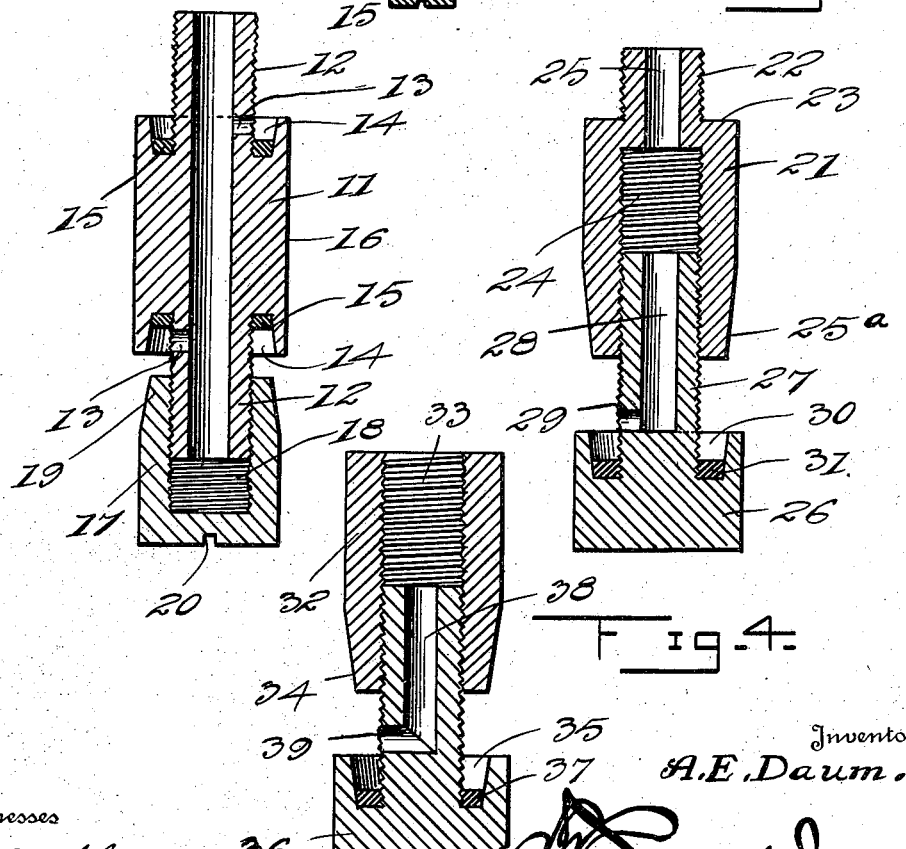

UNITED STATES PATENT OFFICE.

AUGUST E. DAUM, OF ORANGE, NEW JERSEY.

DRAIN-PLUG AND RELIEF-VALVE.

1,192,870. Specification of Letters Patent. Patented Aug. 1, 1916.

Application filed March 19, 1915. Serial No. 15,489.

*To all whom it may concern:*

Be it known that I, AUGUST E. DAUM, a citizen of the United States, residing at Orange, in the county of Essex and State of New Jersey, have invented certain new and useful Improvements in Drain-Plugs and Relief-Valves; and I do hereby declare the following to be a full, clear, and exact description of the invention, such as will enable others skilled in the art to which it appertains to make and use the same.

This invention relates to drain plugs and relief valves, and one of the principal objects of the invention is to provide a device of simple construction to be connected to a water supply pipe in a basement or any part of the house to drain off the water in the pipes in cold weather to prevent freezing.

Another object is to provide a relief valve and drain plug for general use or wherever it is found desirable to provide a vent stopper, a valve to relieve pressure, or a drain cock or plug.

Another object of the invention is to provide a drain plug and relief valve adapted to be connected to various types of water supply cocks, also compression cocks and waste cocks, said drain plug being provided with a tube to be connected to the valve casing of the cock and said tube being provided with a lateral outlet closed by a tapering plug fitted into a flaring seat in the tube and provided with a gasket between the tapering end of the plug and the flaring seat to insure a water tight joint when the plug is turned with its tapering end properly seated, said plug adapted to be turned slightly off the tube to expose the opening in the side of the tube to discharge the water from the house pipes, while the supply cock is closed to shut off the water supply.

The foregoing and other objects may be attained by means of the construction illustrated in the accompanying drawing, in which—

Figure 1 is a sectional view through a water supply cock and through a reversible drain plug made in accordance with this invention. Fig. 2 is a central section through the drain plug removed from the cock or faucet. Fig. 3 is a sectional view showing a drain plug and tube of slightly modified form, and Fig. 4 is a similar view through a still further modified form of plug and tube.

Referring to the drawing, the numeral 1 designates the casing a water supply cock having a valve 2 seated therein, said valve having a central port 3, and a communicating drain duct 4. The casing 1 is provided with an interiorly screw threaded coupling 5 to which a water supply pipe 6 is connected, while the opposite end of the casing is interiorly screw threaded at 7 to receive the threaded end of a pipe leading through the house, as indicated at 8.

As shown in Fig. 1, the casing 1 is provided with tapering boss 9 which is interiorly screw threaded, and an outlet duct 10 communicates with said boss.

Fitted into the tapering boss 9 is a tubular member 11, said member having at each end a reduced exteriorly screw threaded tubular portion 12, each having an outlet duct 13 in one side thereof. At each end of the enlarged portion 11 of the tube is a flaring socket 14 to receive the end of the tapering boss 9, and seated in the flaring socket 14 are compressible washers 15. When the tubular member 11 is connected to the flaring boss 9, by inserting either of the ends 12 within said boss, a wrench may be applied to the outer surface 16 of the tube, which is square or polygonal for that purpose, the ends of the tapering boss 9 will bear against the compressible washer 15 and make an absolutely water tight joint at that point.

Fitted to the opposite ends of the tube upon the exteriorly screw threaded tubular portion 12 is a plug 17, said plug having an interiorly screw threaded socket 18, and the open end of the plug 17 is tapered as at 19 to fit the socket 14 and to bear against the compressible washer 15 to close the outlet or drain duct 13. The plug 17 may be provided with a wrench engaging surface, or a groove 20 for a screw driver or spanner.

In use the plug 17 can be turned two or three times to expose the drain duct 13 without removing the plug, and can be immediately turned back to make the water tight joint after the house pipes have been drained.

As shown in Fig. 3, the tubular member of the device is indicated by the numeral 21 and is provided with a reduced exteriorly screw threaded portion 22 having a square shoulder 23 at the termination thereof, this construction adapted to be engaged with the casing of a water supply cock of peculiar construction. The outer surface of the member 21 may be provided with a wrench engaging member or surface, and is provided with an interiorly screw threaded portion 24, and a smooth bore 25, while the open opposite end of the member 21 is tapered, as shown at 23. The plug for fitting this form of tube comprises a head 26 and an integral tubular member 27 having a smooth bore 28 and a drain duct 29 at one side thereof. In the head 26 is a flaring socket 30 having a gasket or washer 31 therein. The head 26 may be turned by a suitable wrench or by hand to close the drain duct 29 by turning the tubular member 27 within the member 21 with the tapering threaded portion 25$^a$ seated firmly within the flaring socket 30 and bearing against the gasket 31, as will be obvious.

Referring to Fig. 4, the coupling tube 32 is provided with interior screw threads 33 to be connected to the water supply cock of peculiar construction, while the opposite end of the member 32 is provided with a tapering end 34 adapted to fit snugly in the flaring socket 35 of the plug or head 36, said flaring socket having a gasket 37 therein to receive the ends of the member 32. The plug or head 36 is provided with a tubular extension or member 36$^a$ having a bore 38 provided with an angular outlet duct 39 which is adapted to be exposed by turning the head 36.

From the foregoing it will be obvious that a drain plug made in accordance with this invention may be connected to various types of water supply cocks, is simple in construction, may be reversed, and in order to drain the house pipes the plug may be turned two or three times without being turned off the threaded tubular portion, and can be screwed up tight against the washer to insure an absolutely water tight joint when used.

Various changes may be made in the details of construction without departing from the spirit and scope of the invention as defined in the claim.

What is claimed is:

A drain plug or relief valve comprising a tubular portion adapted to be fitted to the waste outlet of a stop cock, said tubular portion being double-ended and reversible and provided with a central bore and laterally communicating outlet ducts, said tubular portion having oppositely disposed flaring sockets surrounding the threaded connection, and a plug fitted to one end of said tubular member, said plug having a tapering end adapted to fit in one of said sockets and to bear against a gasket therein, while the opposite end is fitted to a tapering boss adapted to bear against the gasket in the tapering socket at that end of the tubular member.

In testimony whereof I affix my signature in presence of two witnesses.

AUGUST E. DAUM.

Witnesses:
 FRED JURGENS,
 FRED DORFMEISTER.